United States Patent [19]

Stickney

[11] 3,859,859

[45] Jan. 14, 1975

[54] SPRING SYRINGE DRIVE APPARATUS
[75] Inventor: Michael E. Stickney, Burlingame, Calif.
[73] Assignee: Durrum Instrument Corporation, Palo Alto, Calif.
[22] Filed: June 1, 1973
[21] Appl. No.: 365,969

[52] U.S. Cl. ............... 74/2, 128/218 F, 173/119, 222/137, 222/340, 254/105
[51] Int. Cl.... G05g 17/00, A61m 5/20, G01f 11/06
[58] Field of Search........ 74/2; 173/119; 128/218 F; 222/137, 340; 254/105; 92/13

[56] References Cited
UNITED STATES PATENTS
1,062,855  5/1913   Roe ....................................... 74/2 X
2,820,608  1/1958   Braselmann .................... 254/105 X
2,965,074  12/1960  Williamson ............................. 92/13
3,358,779  12/1967  Cunningham ....................... 173/119
3,729,003  4/1973   Hurschman ................. 128/218 F X
3,789,844  2/1974   Burges ......................... 128/218 F X Primary Examiner—Allan D. Herrmann
Attorney, Agent, or Firm—Flehr, Hohbach, Test, Albritton & Herbert

[57] ABSTRACT

A spring drive apparatus including a drive rod, a spring engaging said drive rod to urge the rod for movement in a predetermined direction, means for compressing said spring and locking it in a compressed condition while the rod remains stationary, means for controlling distance of movement of said rod, and means for releasing the spring for driving the rod, whereby said rod is advanced serially through distances equal to the controlled distance by alternately actuating the means for compressing and releasing the spring.

9 Claims, 8 Drawing Figures

SPRING SYRINGE DRIVE APPARATUS

BACKGROUND OF THE INVENTION

This invention relates to a hand operated spring drive and more particularly to a spring drive apparatus for use with a plurality of self braking syringes.

The requirement often arises for fast delivery and mixing of precise amounts of a number of reactants. The mixed reactants may be utilized in further chemical processing or they may be held in an accessible portion of a flow path for observation. In any event, quick mixing and fast delivery are of paramount importance where a mixture of reactants may undergo chemical transformations which must not be allowed to occur prior to the subsequent use or observation of the mixture.

One such requirement exists in stopped flow spectrophotometry which requires that a small amount of a number of reactants be rapidly mixed in precise proportion, flowed into an observation chamber, and stopped very quickly for measurement of optical absorption as a function of time to determine chemical reaction rates. The time required for the reacting mixture to move from the mixer to the center of the observation chamber, or cuvette, is termed dead time, and establishes the maximum reaction rate which can be measured in any particular observation system. Forces utilized for advancing the syringe pistons to deliver the reactants for mixing often depend upon outside energy sources such as pneumatic, hydraulic, or electrical sources. Means for providing these forces for delivering minute amounts of reactants to a mixer, and subsequently to an observation chamber, are generally complex and quite expensive. It is apparent that a need exists for a drive apparatus for driving syringe reactant containers for emission of small quantities of reactants, substantially during the period of time of the driving stroke only, which has its own internal source of drive energy, and which is relatively lacking in complexity and subsequently inexpensive.

SUMMARY AND OBJECTS OF THE INVENTION

The spring syringe drive apparatus is a device having a driving member for providing a predetermined level of force through a predetermined distance upon triggering the device, and for cocking the device without moving the driving member to again provide the force through a like distance upon retriggering the device. The apparatus is supported on a main support rod which is engaged by upper and lower support rod engaging means which also provide support for the driving member. Force from a driving spring is transferred to the driving member which is held in place by a sear mechanism until triggered by actuation of a triggering mechanism. Cocking is achieved by squeezing together a housing and a pivoted member attached to the housing thus recompressing the spring, reengaging the driving rod with the sear mechanism to hold it against the spring force, and reseting the trigger for the next triggering actuation. Means are provided for releasing the assembly from the support rod for positioning of the driving rod along the length of the support rod.

In general it is an object of the present invention to provide a spring syringe drive having a self contained energy source and providing fast drive action with a low level of complexity.

It is another object of the present invention to provide a spring syringe drive of the above character to provide an inexpensive means for mixing reactants stored in a plurality of syringes containers.

It is another object of the present invention to provide a spring syringe drive of the above character which may be easily removed from a system for ease of maintenance.

It is another object of the present invention to provide a spring syringe drive of the above character which produces driving strokes having a force which may be modified by selection and installation of various springs.

It is another object of the present invention to provide a spring syringe drive of the above character which has an adjustable driving stroke length.

It is another object of the present invention to provide a spring syringe drive of the above character having a driving rod which automatically follows the driven syringe pistons from stroke to stroke and does not move them during the cocking procedure.

It is another object of the present invention to provide a spring syringe drive of the above character which requires no outside energy sources other than that provided by the operator.

It is another object of the present invention to provide a spring syringe drive of the above character which is easily released and moved for insertion and extraction of syringes.

Additional objects and features of the invention will appear from the following description in which the preferred embodiment has been set forth in detail in conjunction with the accompanying drawings.

DESCRIPTION OF THE PREFERRED EMBODIMENTS

Figure 1:
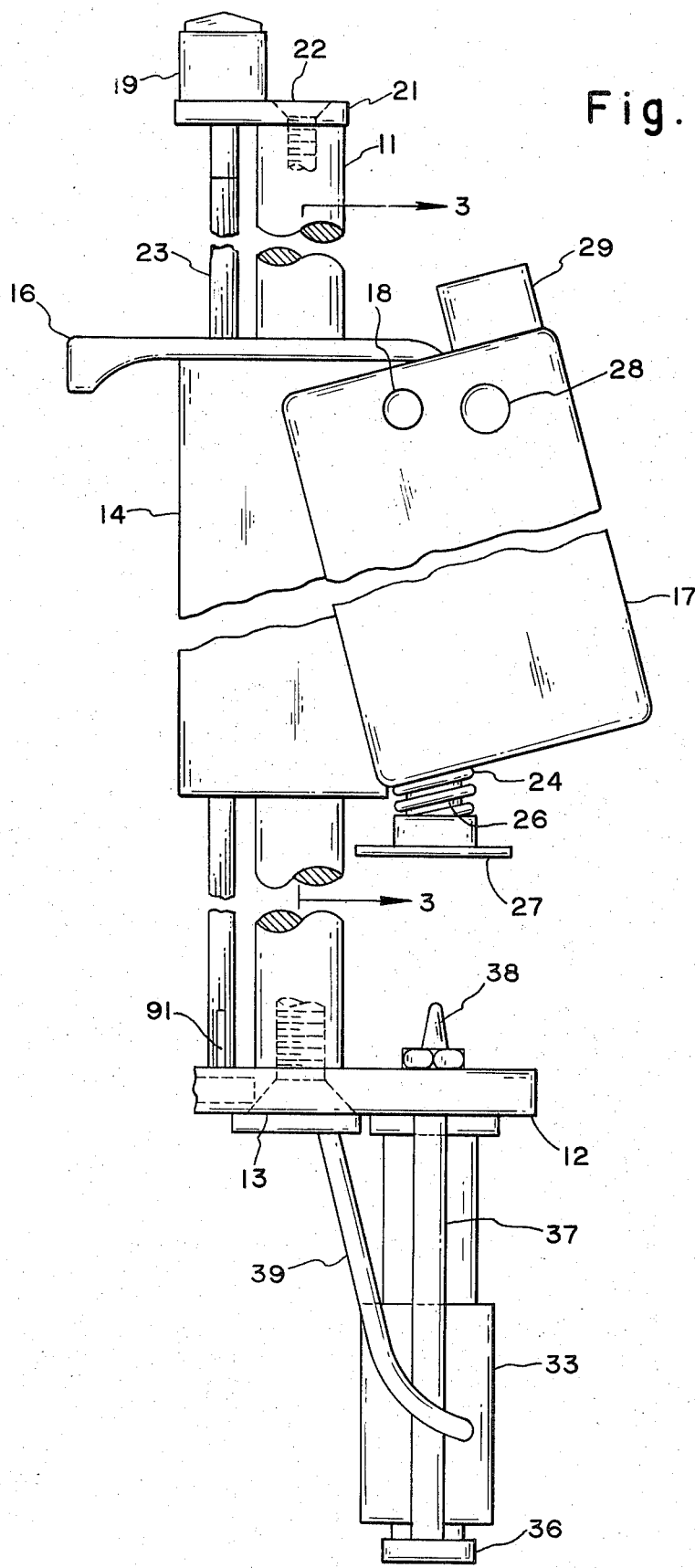
FIG. 1 is a side elevation view of the spring syringe drive apparatus.

The spring syringe drive disclosed herein provides a fast positive stroke of predetermined length which may be applied to the pistons of syringes holding reactants to be mixed and further utilized or observed. The syringe drive imparts no motion to the syringe pistons at any time other than during the driving stroke after it is triggered. Referring to FIG. 1 of the drawings a support rod 11 is seen which is attached to a base 12 by means of a screw 13. A housing 14 surrounds the support rod 11 and has a top cover 16 attached thereto. A pivoted member 17 is pivotally attached to housing 14 by means of housing bearings 18. A trigger knob 19 is mounted on a plate 21 attached to the top of support rod 11 by a screw 22. A trigger rod 23 is fixed to trigger knob 19 and turns therewith. Trigger rod 23 extends through housing 14 parallel to support rod 11 and is rotatably supported on the base 12.

A driving spring 24 surrounds a driving member for transmitting spring force such as drive rod 26 which carries a ram 27 on its lower end in this embodiment. The pivoted member 17 encloses the drive rod 24 and has attached internally a cocking bearing 28. A lockout push button 29 extends through the upper portion of the pivoted member 17. A return spring 30 is provided for maintaining lock out push button 29 in an extended position.

Figure 2:
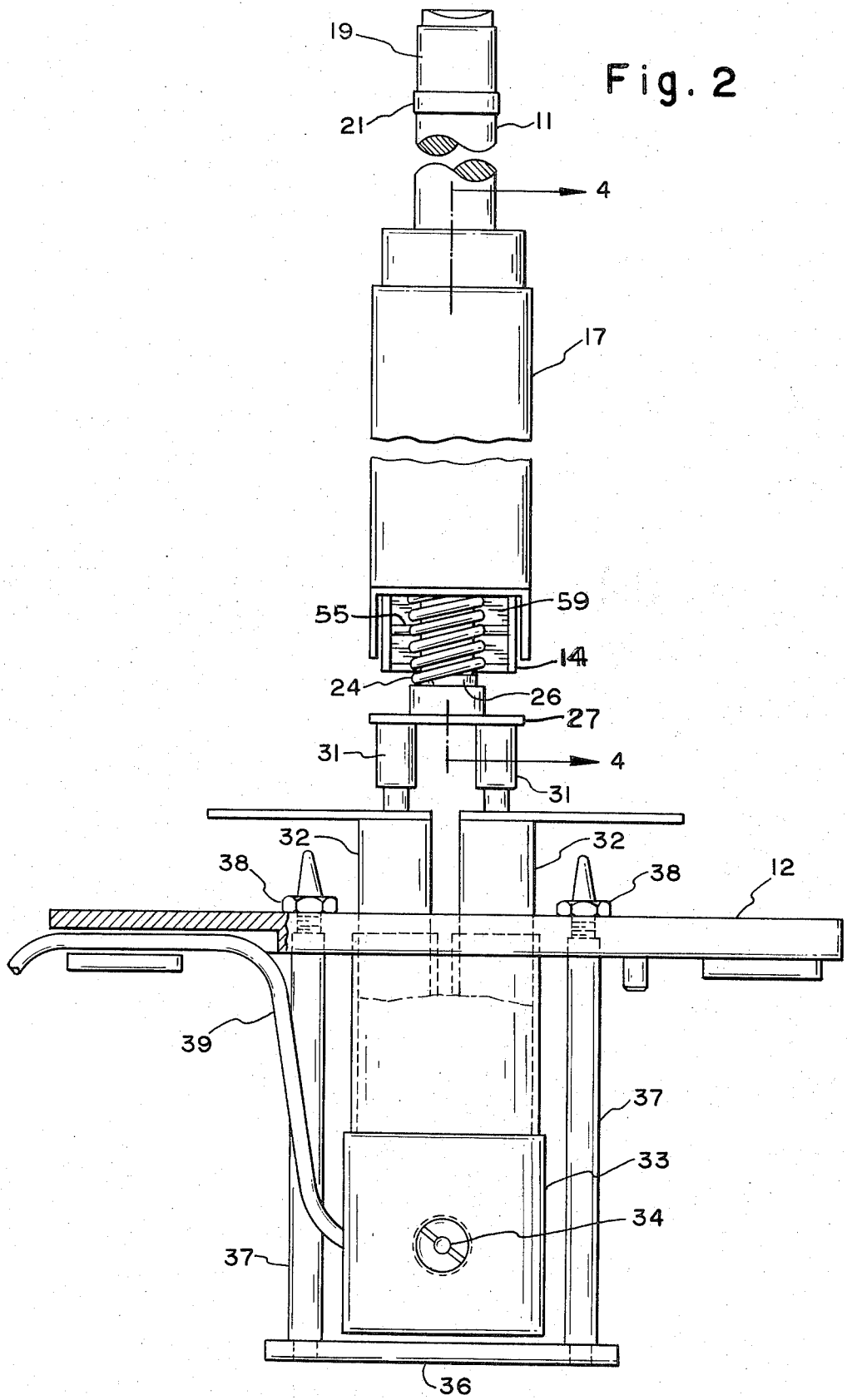
FIG. 2 is a front elevation view of the spring syringe drive apparatus.

As best seen in FIG. 2 ram 27 is shown in contact with pistons 31 which enter syringe bodies 32 which are in turn inserted in an integrated flow path block 33. The integrated flow path block 33 has an optical path therethrough as seen at 34. Integrated flow path block 33 is supported by a keeper 36 which in turn is supported by a pair of keeper tie rods 37 extending below base 12 and attached thereto by nuts 38. A tube 39 directs the efflux from the integrated flow path block 33.

Figure 3:
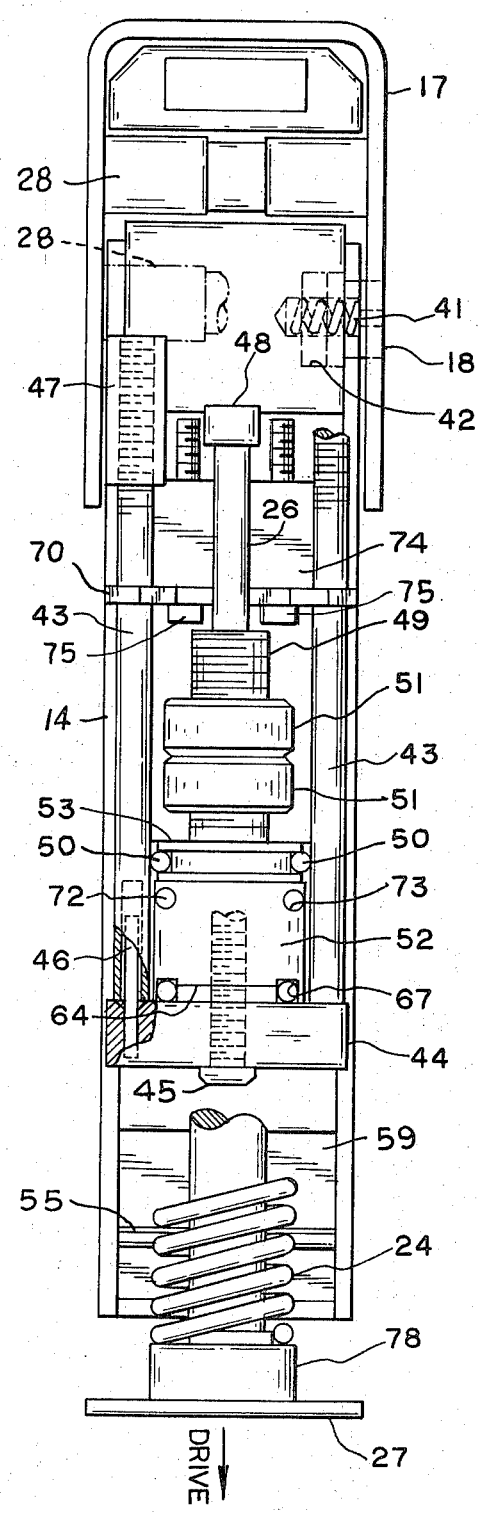
FIG. 3 is a sectional view along the line 3—3 of FIG. 1.

Referring to FIG. 3 a sectional view is seen from along the line 3—3 of FIG. 1. The details of the housing bearings 18 are shown. The bearings 18 are shown supported by a spring 41 centrally disposed therein which extend into a bore 42 shown in the top cover 16.

As seen in FIG. 3 a pair of cocking rods 43 having concial lower ends extend from a lower locking block 44 toward the top of the assembly. A pair of pins 46 are permanently pressed into the lower locking block 44. Pins 46 extend above block 44 into a central bore in each cocking rod 43 to retain them in conical seats in block 44. Cocking rod verniers 47 are threadably attached to the tops of the cocking rods 43.

Figure 4:
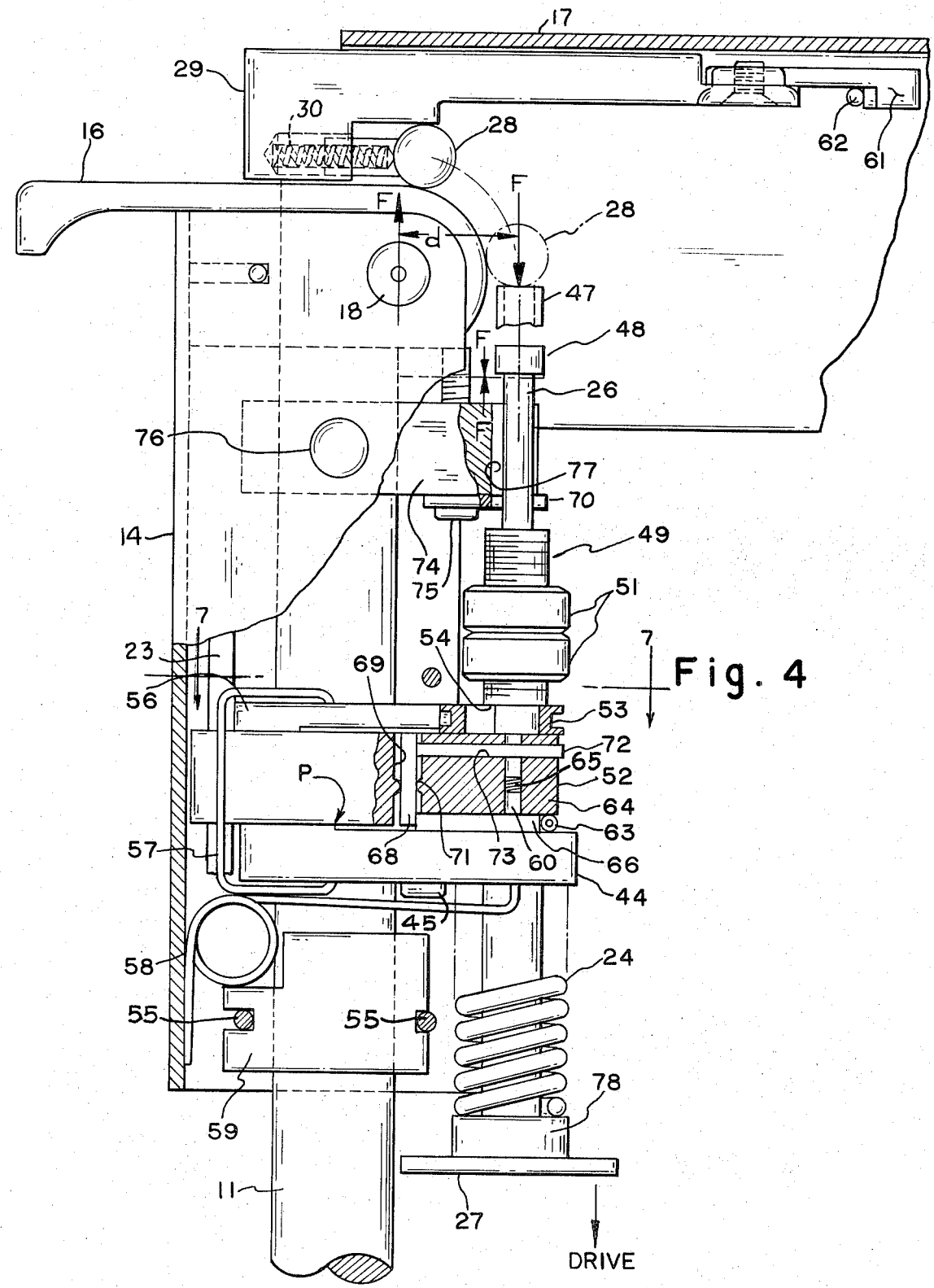
FIG. 4 is a sectional view along the line 4—4 of FIG. 2.

As seen in FIGS. 3 and 4 driving rod 26 has a boss 48 at the top and a threaded section 49 near the center. A pair of stop nuts 51 engage the threads 49 and are forced together on the threads to lock on the driving rod 26. Driving rod 26 extends through a hole in the lower locking block 44, and a stop block 52 is disposed immediately above the lower locking block 44. A sear ring 53 is disposed between the stop block 52 and the stop nuts 51. Sear ring 53 fits in a circumferential groove 54 seen in FIG. 4 in driving rod 26 below the threads 49. Transfer plate 56 contacts the edge of sear ring 53 and rests on the top side of stop block 52. Transfer plate 56, stop block 52, and lower block 44 are held together by the stop block spring 57. A bolt 45 passes through a lower lock block 44 for threaded engagement with stop block 52 to assure stop block 52 follows lower lock block 44 in proper juxtaposition during cocking operations and to prevent a reverse couple from being applied between lower locking block 44 and support rod 11 while manually moving spring drive assembly up the support rod 11 to permit removal and replacement of syringe 32. A pair of sear ring guide pins 50 extend from transfer plate 56 entering a circumferential groove which is shown in the periphery of sear ring 53.

As seen in FIG. 4 a double torsion spring 58 urges the stop block 44 toward a predetermined position relative to the bottom of the housing 14. The housing 14 also carries a lower guide block 59 surrounding the support rod 11 lower guide block 59 is held in place within housing 14 by a pair of dowel pins 55. Thus the support rod 11 extends through the interior of the housing 14 guided therethrough by the lower guide block 59 on one end and the top cover 16 on the other.

The pivoted member 17 has disposed therein the lockout push button 29 as discussed above. Attached to the lower end of the lockout push button is the lockout actuator 61. Attached to the lockout actuator is the lockout stop pin 62 as seen in FIG. 4. A lockout bit 63 is positioned above the lower block 44 and is movable. A groove 64 is formed at the forward edge of the underside of the stop block 52. A pair of restorer pins 66 are engaged by lockout bit 63 when in the groove 64. Restorer pins 66 are located in grooves 67 formed on the underside of stop block 52. A pair of transfer pins 68 lie in holes 69 in stop block 52 having fulcrum points 71 formed approximately at the midpoint in the depth of hole 69. Transfer pins 68 contact the ends of restorer pins 66. The other end of transfer pins 68 contact the ends of locking pins 72 disposed in holes 73 in the stop block 52.

Braking pins 60 are disposed to bear against pins 72 and 68. The pins 60 are urged against pins 72 and 68 by a spring 65 so that they are orientation insensitive.

An upper locking block 74 is attached to the housing 14 pivoting about the upper lock block bearings 76. Support rod 11 passes through the upper lock block 74 in much the same manner as it passes through lower lock block 44. Upper lock block 74 extends toward drive rod 26 having an opening 77 smaller than the boss 48 surrounding drive rod 26 and below boss 48 in the assembly as seen in FIGS. 3 and 4 cocking rod guide plate 70 is attached to the underside of upper lock block 74 by means of screws 75.

Turning now to the operation of the spring syringe drive apparatus it may be seen in FIG. 4 that the drive spring 24 is trapped between the underside of the lower locking block 44 and a shoulder 78 on the backside of ram 27. Ram 27 is the member which transfers the spring force from the driving rod 26 to the member being moved, as for example the piston 31 in the syringe 32 of FIG. 2. The spring force from spring 24 is transmitted through driving rod 26, sear ring 53, stop block 52, and back to the opposite end of spring 24 through lower locking block 44. Stop block 52 and lower locking block 44 are placed on support rod 11 by inserting supporting rod 11 through holes of proper diameter contained in each member. Stop block 52 and lower locking block 44 are forced together by the force from spring 24 as described above.

Figure 5:
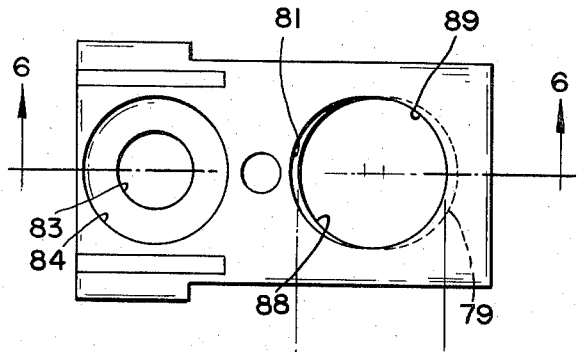
FIG. 5 is a plan view of the lower locking block.
Figure 6:
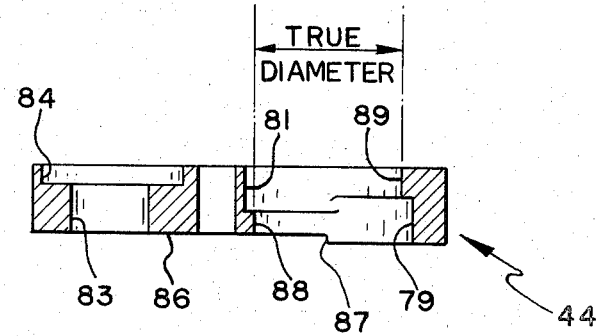
FIG. 6 is a sectional view along the line 6—6 of FIG. 5.

Referring to FIG. 5 the details of the shape of the lower locking block 44 are shown. Note that the hole for accommodating the support rod 11 is formed of two counter bores 79 and 81 extending more than half way through lower lock block 44 from the upper surface and the lower surface thereof respectively. The center line of counter bores 79 and 81 are offset from the center of the opening which accommodates support rod 11.

A clearance hole 83 extends through lower lock block 44 which allows passage of driving rod 26 when assembled. A counter bore 84 on the lower surface of lower locking block 44 surrounds clearance hole 83 acting as a seat for the upper end of drive spring 24. The upper surface 86 of lower locking block 44 is relieved from the center line of the hole accommodating support rod 11 to the edge of the member in the direction of the clearance hole 83. This relief 86 forms a fulcrum 87 in line with the center of the hole accommodating support rod 11. When assembled, spring forces acting on the underside of lower locking block 44 about fulcrum 87 force the surfaces 88 and 89 in counter bores 79 and 81 respectively into high pressure contact with the support rod 11, thereby locking the lower locking block 44 to the support rod 11, providing a reference position for driving rod 26.

Figure 7:
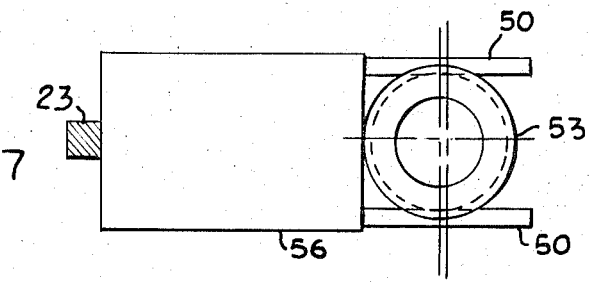
FIG. 7 is a sectional view along the lines 7—7 or FIG. 4.
Figure 8:
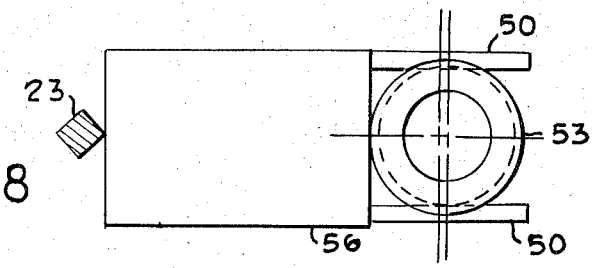
FIG. 8 is a sectional view of the trigger sequence components.

When the spring syringe drive apparatus is cocked, release of driving rod 26 permits ram 27 to provide a force of a predetermined level to drive the ram through a predetermined distance. The predetermined distance is adjusted by positioning the lock nuts 51 on the threads of drive rod 26 and forcing them together to maintain the position. Triggering the mechanism occurs when sear ring 53 is disengaged from circumferential groove 54 in driving rod 26 by turning trigger knob 19 which turns square trigger rod 23 about a pivot point 91 on the base 12 which may be seen by reference to FIGS. 7 and 8. The corner of the trigger rod 23 engages the rear of transfer plate 56 which pushes against the sear ring 53 forcing it out of groove 54. When released, driving rod 26 and ram 27 driven by spring 24 move until stop nuts 51 strike the top side of sear ring 53 restraining spring 24 from further extension. Spring 24 continues to exert force against lower locking block 44 thus retaining the lock and the necessary fixed reference for the driving rod as explained above.

In preparing the spring syringe drive apparatus for the next drive stroke the apparatus is cocked. Cocking requires recompression of drive spring 24 by moving the lower locking block 44 and adjacent stop block 52, sear ring 53 and transfer plate 56 held together by stop block spring 57 along support column 11 to establish a new reference. The new reference is displaced from the original reference by a distance exactly equal to the stroke length of the driving rod 26. Sear ring 53 is replaced into groove 54 in driving rod 26. Driving rod 26 must remain stationary during the cocking operation to prevent undesirable results from movement of ram 27 during cocking.

The cocking operation is performed by squeezing compressing housing 17 and pivoted member 14 together about housing bearings 18. One hand is normally used to affect this operation. Rotation of housing 17 about housing bearings 18 causes the cocking bearing 28 to bear against cocking rods 43 which bear against the lower locking block 44. The lower locking block 44, still locked to the support column 11, lifts the housing 14 to a point where the upper locking block 74 contacts the underside of the boss 48 on the end of driving rod 26. Until this point the lower locking block 44 is locked to the support rod 11 by a couple resulting from the force of the spring 24 on the underside of locking block 44 and the reaction forces between the support rod 11 and the high pressure contact areas 88 and 89 on locking block 44. Contact boss 48 causes upper locking block 74 to rotate about bearings 76 and to lock to support rod 11 in the same fashion as lower locking block 44. Continued compression of the housing 14 and pivoted member 17 transmits force through cocking rods 43 by way of the cocking bearing 28 through the lower locking block 44 on the line of force exerted by spring 24. This removes the couple locking lower locking block 44 support rod 11 freeing it from support rod 11 and it is moved with stop block 52 and transfer plate 56 downward along support rod 11 compressing driving spring 24.

Pivotal motion of the pivoted members 17 is limited by contact of the lockout actuator 61 with the sear ring 53, pushing sear ring 53 back into groove 54 in driving rod 26. Locking pins 72 also bar further rotation of outer housing 17.

Release of pivoted member 17 permits the lower locking block 44 and associated members to move back up support rod 11 to a point where sear ring 53 contacts the upper edge of groove 54 in driving rod 26. Driving spring 24 once again applies force to lower locking block 44 and locking action is transferred from upper locking block 74 to lower locking block 44 as upper locking block 74 is permitted to drop away from boss 48 on the upper end of driving rod 26. Housing 14 continues to drop along support rod 11 due to the action of double torsion spring 58 against the bottom of lower locking block 44 thus restoring the spring drive assembly to a ready to trigger position.

It is necessary to be able to unlock the spring drive assembly from the support rod 11 to permit the driving rod and associated assemblies to be moved up the support rod 11 for insertion and extraction of syringes, and to be moved down support rod 11 to be placed in contact with syringe pistons 31 to accomplish the first stroke. This operation is performed by depressing the lockout push button 29 and compressing housing 14 and pivoted member 17 exactly as in the cocking operation described above. Depressing lockout push button 29 moves lockout actuator 61 to a lower position so that motion of pivoted member 17 is no longer limited by sear ring 53 and locking pins 72. In this condition pivotal motion of pivoted member 17 is limited by lockout bit 63. Lockout bit 63 is thus forced into groove 64 on the underside of the forward edge of stop block 52. When compressive pressure is removed from housing 14 and pivoted member 17, drive spring 24 clamps lockout bit 63 between lower locking block 44 and stop block 52. The couple creating high contact pressure at surfaces 88 and 89 on lower locking block 44 is removed as the spring force is passed to the stop block 52 through the lockout bit 63. Stated another way, the tendency for rotational motion about the fulcrum 87 between the stop block 52 and the lower locking block 44 which is necessary to lock lower locking block 44 to support column 11 is removed by the insertion of lockout bit 63 and lower locking block 44 is released from support rod 11 allowing it to be moved up and down the support rod.

Pushing lockout bit 63 into the groove 64 forces restorer pins 66 back through restorer pin groove 67, contacting the lower end of transfer pins 68 and causing the upper end of transfer pins 68 to rotate clockwise about fulcrum 71 in groove 69. This latter rotation pushes locking pins 72 outward in locking pin holes 73 to extend outwardly from the face of stop block 52.

To restore the drive spring assembly to the condition where lower locking block 44 is again locked to support rod 11, it is only necessary to compress the housing 14 and pivoted member 17 together as for cocking. When the lockout actuator 62 contacts the locking pins 72 they are moved inward in locking pin holes 73, reversing the motion of transfer pins 68 and pushing restorer pins 66 outward to dislodge lockout bit 63 from lockout bit groove 64 allowing the locking couple mentioned above to be reasserted thus restoring the locked condition for lower locking block 44 to support rod 11.

The foregoing discloses a spring syringe drive apparatus which is capable of release from the support column for insertion of syringes and syringe pistons and for positioning the driving rod ram on the end of the syringe pistons preparatory to the initial stroke. Actuation of the trigger rod provides the initial stroke, and cocking provides for resetting the trigger means without moving the driving rod so that serial strokes of a predetermined length may be performed by each cocking and triggering sequence. The apparatus may be used as a syringe piston drive means for a mixer alone or for a stopped flow spectrophotometry system component. In either event a spring syringe drive apparatus is provided with driving strokes, by way of example, of 25 pounds force, or any reasonable modification thereof by choice of spring. The length of driving stroke is adjustable, and the apparatus is completely hand operated.

I claim:

1. A spring drive apparatus including a driving member, a spring engaging said driving member urging said driving member for movement in a predetermined direction, means for compressing said spring, means for controlling distance of movement of said driving member, and trigger means causing said spring to act upon said driving member to move it over said distance, wherein said means for compressing said spring moves said means for controlling distance of movement withou moving said driving member, whereby said driving member moves serially through said distance from a new reference each time said means for compressing said spring and said trigger means are actuated.

2. In a spring drive apparatus for providing a repeated driving force over a predetermined distance, a housing having upper and lower openings, a support rod within said housing extending through said openings, lower support rod engaging means establishing a fixed reference for the predetermined distance, upper support rod engaging means supported in said housing, a driving member guided by said upper and lower support rod engaging means, a spring for providing a force urging said driving member, means for retaining said driving member against said spring force, trigger means for releasing said retaining means, means for stopping said driving member after an advance through the predetermined distance, and cocking means for recompressing said spring, and reengaging said retaining means, said cocking means operating to place said driving member in condition to drive through a repeated predetermined distance.

3. A spring drive apparatus as in claim 2 wherein said cocking means comprises a pivoted member, housing bearings connecting said housing and said pivoted member for pivotal motion therebetween, cocking bearings movable relative to said housing, cocking rods engaged by said cocking bearings and attached to said lower support rod engaging means, and a boss on said driving member, whereby when said pivoted member is compressed toward said housing said cocking means operates to hold said driving member motionless, by engagement of said boss with said upper support rod engaging means and said lower support rod engaging means is unlocked from said support rod and advanced along said support rod for establishing a new reference for the predetermined distance.

4. A spring drive apparatus as in claim 2 wherein said lower support rod engaging means includes a stop block and a lower locking block formed to permit relative motion therebetween surrounding said driving rod together with lockout means for insertion between said stop block and lower locking block, said lower support rod engaging means operating to lock to said support rod when said lockout means is not inserted, together with release means for allowing said housing to be moved up and down said support rod for positioning of said driving member.

5. A spring drive apparatus as in claim 4 wherein said release means comprises slidable means within said pivotal member for contacting and forcing said lockout means between said stop block and said lower locking block, whereby said lower support rod engaging means is unlocked from said support rod when said slidable means is depressed and said pivotal member is compressed toward said housing.

6. A spring drive apparatus as in claim 2 wherein said lower support rod engaging means includes a stop block, and wherein said retaining means comprises a sear ring adjacent to said stop block, and wherein said means for stopping includes adjustable means attached to said driving member for bearing against said sear ring after actuation of said trigger means.

7. A spring drive apparatus as in claim 2 wherein said driving rod has a circumferential groove disposed thereon, and wherein said means for retaining said driving member comprises a sear ring surrounding said driving rod formed to fit in said circumferential groove, said sear ring bearing against said lower support rod engaging means.

8. A spring drive apparatus for providing a predetermined force over a predetermined distance comprising a support rod, a housing for containing said support rod, a driving member, upper support rod engaging means having a guide for said driving member, lower support rod engaging means having a guide for said driving member, a pivotal member attached to said housing, a spring providing the predetermined force for urging said driving member, a stop for limiting the driving member travel to the predetermined distance, trigger means for releasing said driving member to traverse the predetermined distance, cocking means actuated by relative motion between said housing and said pivotal member for compressing said spring, resetting said trigger means and repositioning said lower support rod engaging means on said support rod to provide a new reference for the predetermined distance, said cocking means operating without moving said driving member so that said driving member is urged to advance serially through the predetermined distance upon each trigger actuation.

9. A spring drive apparatus as in claim 8 together with release means for unlocking said lower support rod engaging means and for allowing said housing to be moved along said support rod for positioning said driving member.

* * * * *